United States Patent [19]

Bainbridge et al.

[11] Patent Number: 4,618,299
[45] Date of Patent: Oct. 21, 1986

[54] LOCKNUT AND KEY THEREFOR

[75] Inventors: Gary R. Bainbridge, North Tonawanda; Lewis D. McCauley, Eggertsville; John H. Taylor, Orchard Park, all of N.Y.

[73] Assignee: McGard, Inc., Buffalo, N.Y.

[21] Appl. No.: 587,135

[22] Filed: Mar. 7, 1984

[51] Int. Cl.$^4$ .................. F16B 23/00; F16B 37/14
[52] U.S. Cl. ........................ 411/374; 81/451; 81/460; 411/403; 411/429; 411/910
[58] Field of Search ............ 411/373, 374, 396, 397, 411/402, 403, 408, 410, 427, 429, 431, 432, 910, 911; 81/436, 451, 460

[56] References Cited

U.S. PATENT DOCUMENTS

| 641,191 | 1/1900 | Champion | 411/402 |
|---|---|---|---|
| 2,823,725 | 2/1958 | Trinca | 411/919 X |
| 3,241,408 | 3/1966 | McCauley | 81/71 |
| 3,288,185 | 11/1966 | Clark | 81/451 |
| 3,369,441 | 2/1968 | Kosar | 411/410 |
| 3,449,988 | 6/1969 | Gallo | 411/403 X |
| 3,492,841 | 2/1970 | Ipri | 411/429 X |
| 3,739,825 | 6/1973 | Knox | 81/451 |
| 3,821,975 | 7/1974 | Haker | 145/50 A |
| 3,874,258 | 4/1975 | Semola et al. | 81/121 |
| 4,027,572 | 6/1977 | Burge | 85/32 R |
| 4,038,757 | 8/1977 | Hicks et al. | 33/247 |
| 4,170,918 | 10/1979 | Burge | 411/427 |
| 4,427,326 | 1/1984 | Hobson et al. | 411/5 |
| 4,480,513 | 11/1984 | McCauley et al. | 411/403 X |

FOREIGN PATENT DOCUMENTS

| 1025709 | 2/1978 | Canada | 411/427 |
|---|---|---|---|
| 110624 | 4/1964 | Czechoslovakia | 81/436 |
| 197064 | 5/1907 | Fed. Rep. of Germany | 81/451 |
| 845915 | 5/1939 | France | 81/90 C |
| 1020232 | 11/1952 | France | 411/373 |
| 636531 | 5/1960 | Italy | 411/429 |
| 2006371 | 5/1979 | United Kingdom | 411/427 |
| 2095356 | 9/1982 | United Kingdom | 411/910 |
| 135310 | 3/1960 | U.S.S.R. | 411/427 |
| 490727 | 2/1976 | U.S.S.R. | 81/451 |
| 724813 | 3/1980 | U.S.S.R. | 411/374 |

Primary Examiner—Thomas J. Holko
Attorney, Agent, or Firm—Joseph P. Gastel

[57] ABSTRACT

A locknut having a body portion with an outer surface and first and second ends, a thread extending inwardly into the body portion from the first end, a depression in the second end, an inwardly tapered lobed curvilinear surface defining the periphery of the depression for receiving a mating key, and an external thread extending from the second end onto the outer surface for receiving the internally threaded surface of a sleeve mounted on a key for attaching the key to the locknut. The locknut as described above including a rotatable sleeve mounted thereon with a shroud located radially outwardly of the external thread. A locknut as described above wherein the outer surface extending from the first end is frustoconical and terminates at an annular shoulder which is located radially outwardly of the external thread.

4 Claims, 20 Drawing Figures

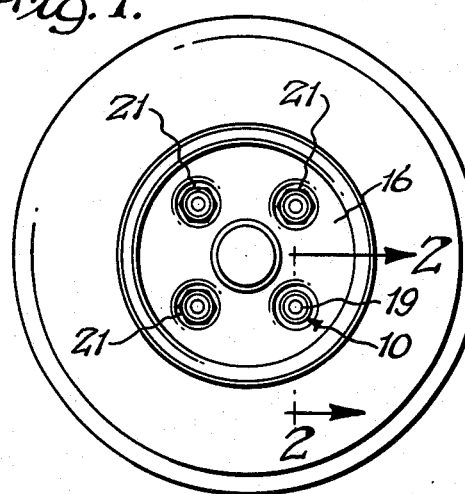
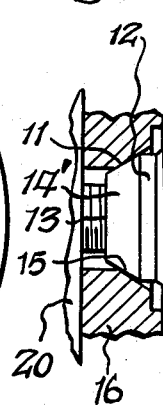
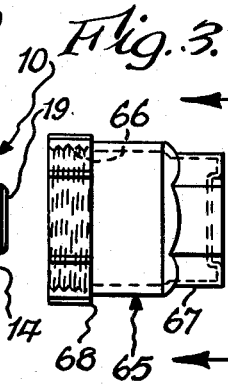
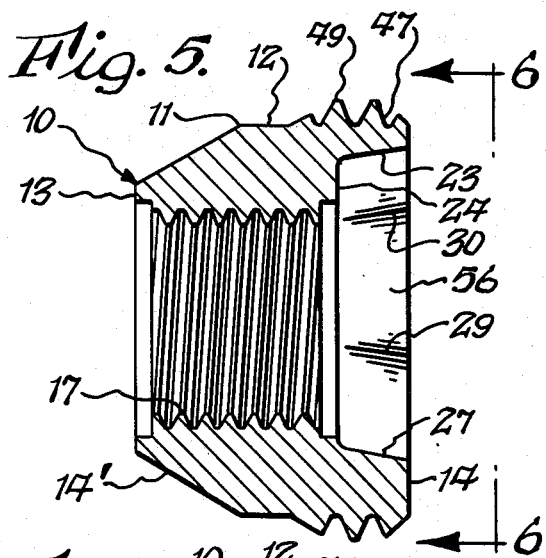
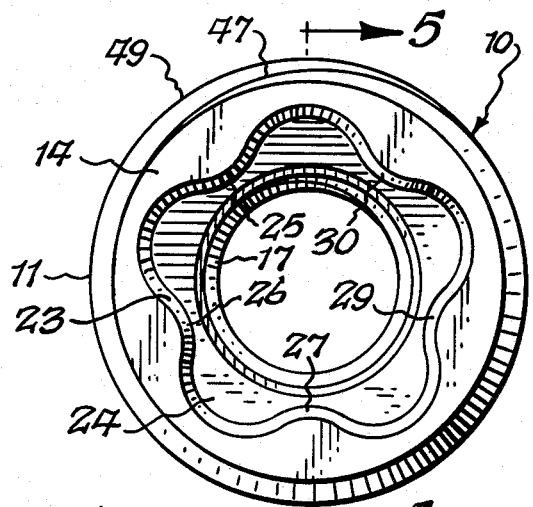
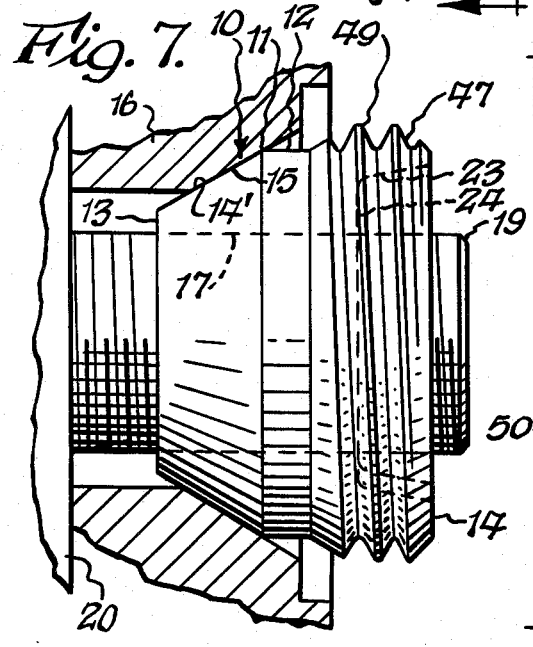
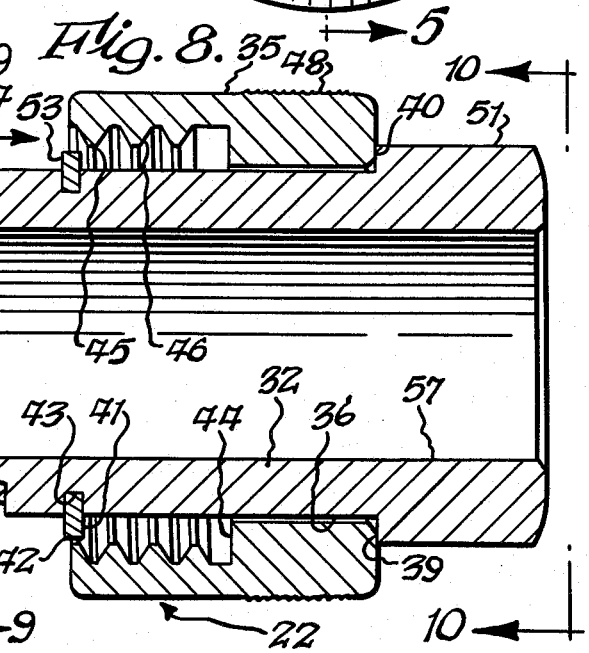

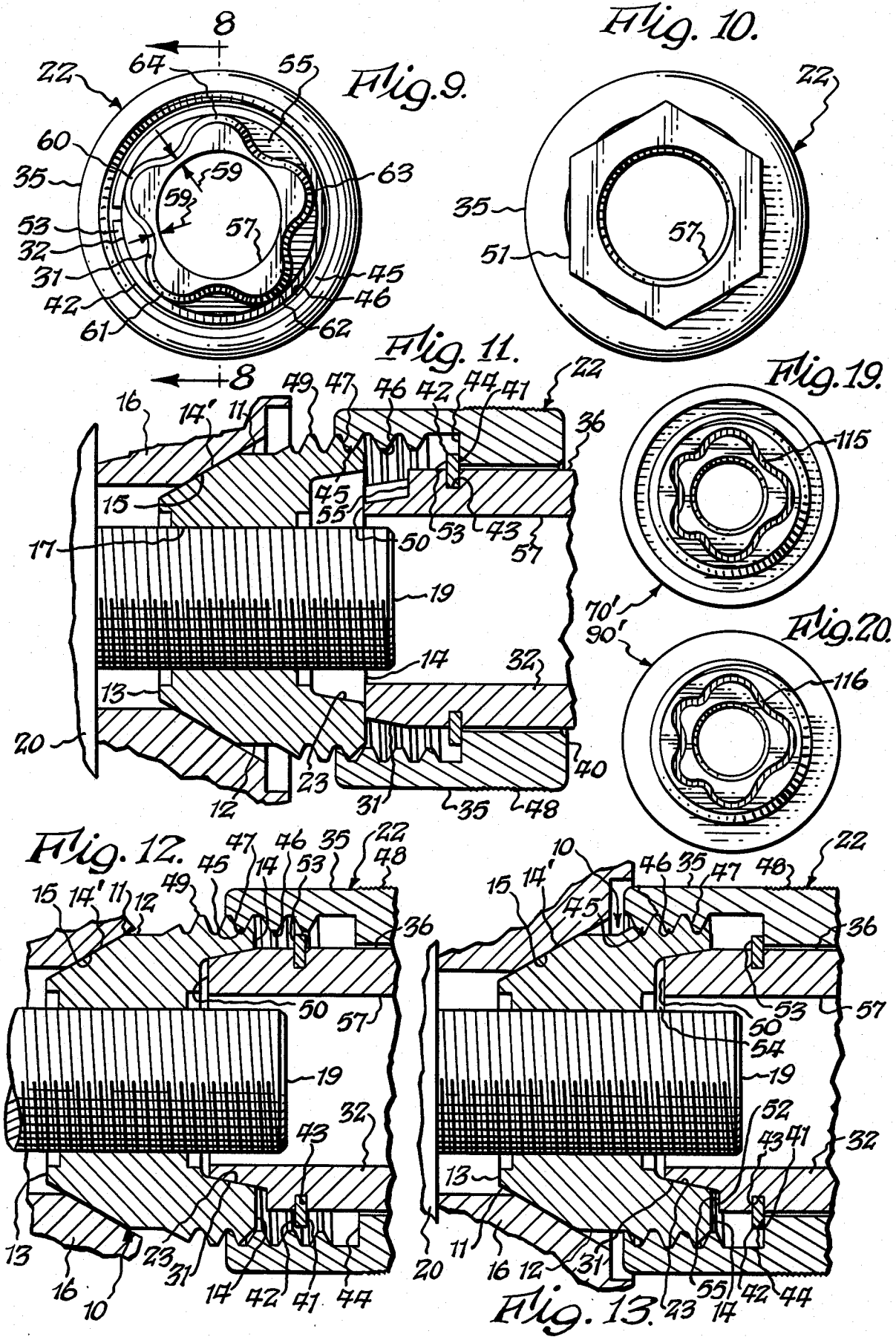

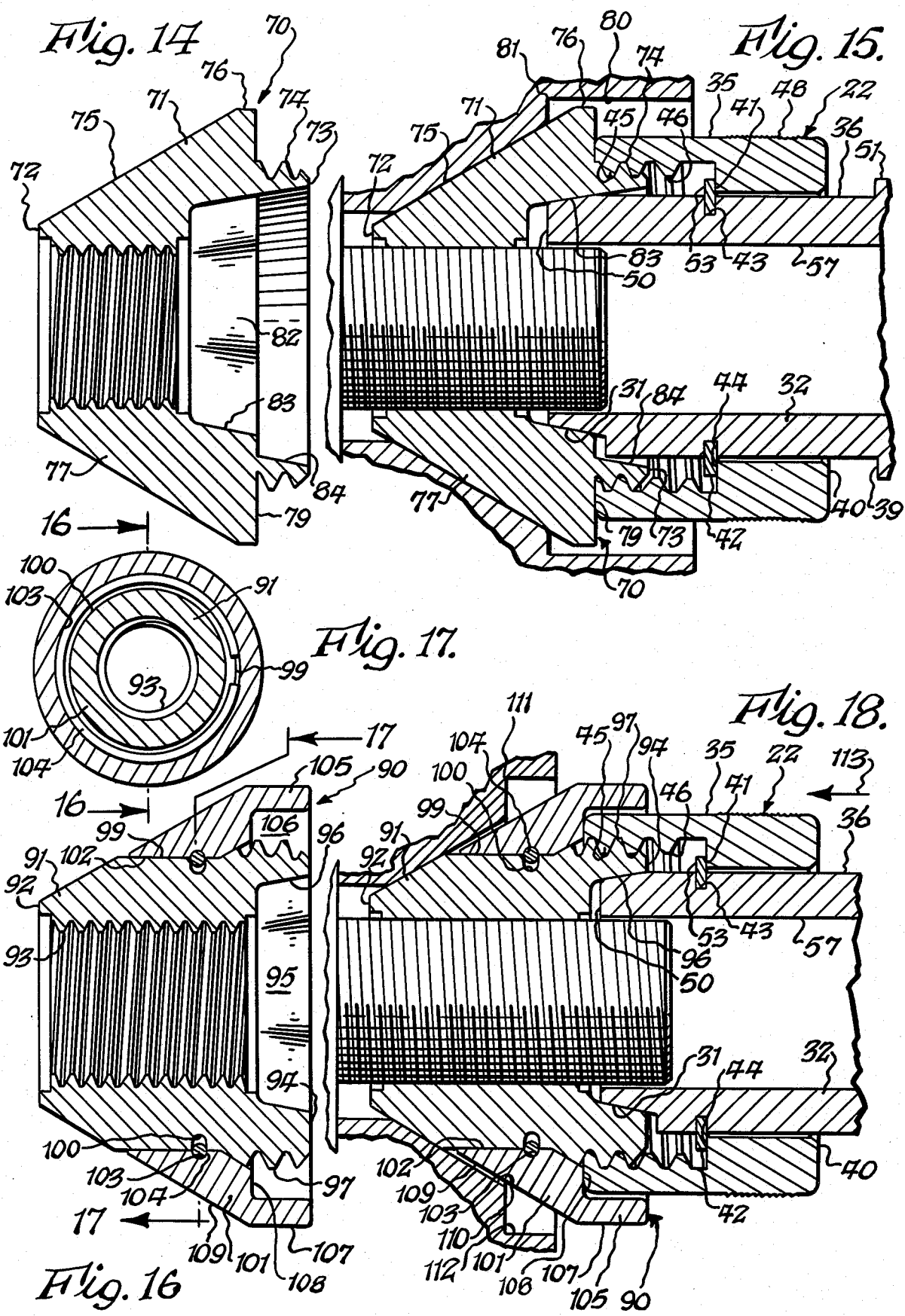

LOCKNUT AND KEY THEREFOR

BACKGROUND OF THE INVENTION

The present invention relates to an improved locknut and key therefor.

By way of background, there are now in common use locknuts and keys of the type generally shown in U.S. Pat. No. 3,241,498. These locknuts are used to prevent unauthorized removal of automotive wheel rims. As explained in the foregoing patent, the locknuts can be removed only by use of a special key which has a curvilinear flange which is received in a mating curvilinear groove in the locknut. Fabricating an elongated curvilinear groove is a relatively difficult and expensive machining operation. In addition, if the torque applied to the key is not distributed squarely on the locknut, the key can slip from the groove. Also, in the past, aligning the flange of the key into the curvilinear groove of the locknut has been difficult because the key had to be rotated relative to the nut while perfect axial alignment was maintained until the flange dropped into the groove. If there was any misalignment, the mating relationship could not be achieved. It is with overcoming the foregoing deficiencies of the prior art that the present invention is concerned.

SUMMARY OF THE INVENTION

It is accordingly one object of the present invention to provide an improved locknut and key combination wherein the key can be inserted into a curvilinear depression on the locknut in an extremely simple and expedient manner. A related object of the present invention is to utilize a guiding collar to insure precise alignment between the key and the nut and which permits the key to be rotated, while in such axial alignment, until it is received in the curvilinear depression.

Another object of the present invention is to provide an improved locknut and key combination wherein the key is locked to the nut to thereby obviate slipping of the key from the locknut after they have been placed in mating engagement.

Yet another object of the present invention is to provide an improved locknut which utilizes the tapered curvilinear surface having lobes which can be machined more simply than curvilinear grooves of the prior art.

Still another object of the present invention is to provide a locknut having a key-receiving surface which is so tapered that an unauthorized nut-turning tool will "cam-out" of the key-receiving surface due to the tapered configuration, thereby precluding unauthorized turning of the nut.

Yet another object of the present invention is to provide an improved locknut having a threaded external surface for locking engagement with a key and which includes a rotatable shroud surrounding the threaded portion to prevent turning of the nut by the application of a wrench thereto.

A further object of the present invention is to provide an improved locknut having a short axial thread thereon which cannot be gripped by a wrench but which will receive a sleeve used to attach a key to the locknut. Other objects and attendant advantages of the present invention will readily be perceived hereafter.

The present invention relates to a locknut comprising a body portion having an outer surface and an axis of rotation and first and second opposite ends, a threaded bore extending inwardly into said body portion from said first end, a depression extending inwardly into said body portion from said second end, an endless lobed curvilinear surface located outwardly of said axis of rotation and defining the periphery of said depression, and a taper on said endless lobed curvilinear surface extending from said second end inwardly toward said axis of rotation.

The present invention also relates to a locknut as set forth above which also includes a thread on said outer surface extending inwardly from said second end toward said first end, a key having first and second key ends and a central portion therebetween, a first portion on said first key end for complementary mating engagement with said lobed curvilinear surface of said nut, a sleeve on said central portion, an internal surface on said sleeve, a second thread on said internal surface for mating engagement with said thread, interengaging means between said sleeve and said central portion for maintaining said first portion on said key end in engagement with said lobed curvilinear surface, and wrench-receiving means on said second key end.

The present invention also relates to a locknut comprising a body portion having an axis of rotation and an outer surface and first and second ends, a threaded bore extending inwardly into said body portion from said first end, lobed curvilinear key-receiving means extending inwardly into said body portion from said second end, a thread on said outer surface extending inwardly onto said body portion from said second end, a central portion on said outer surface beween said thread and said first end, a sleeve, means rotatably mounting said sleeve on said central portion, and a shroud portion on said sleeve overlying said thread.

The present invention also relates to a locknut comprising a body portion having an outer surface and an axis of rotation and first and second ends, a threaded bore extending inwardly into said body portion from said first end, lobed curvilinear key-receiving means extending inwardly into said body portion from said second end, a thread on said outer surface extending inwardly onto said body portion from said second end, a frustoconical portion on said body portion having its smaller end at said first end and its larger end proximate said thread, and said frustoconical portion terminating at an annular shoulder at said larger end with said shoulder being located proximate said thread and being of a greater diameter than said thread.

The present invention also relates to a key for a locknut comprising a body portion having first and second ends and a central portion therebetween, an external tapered lobed curvilinear surface proximate said first end, a wrench-receiving portion proximate said second end, a sleeve slidably mounted on said central portion, an internally threaded portion on said sleeve facing said first end, an internal shoulder on said sleeve between said internally threaded portion and said second end, and an external shoulder on said central portion between said external tapered lobed curvilinear surface and said internal shoulder.

The present invention also includes a locknut and stud combination comprising a locknut including a body portion having an outer surface and an axis of rotation and first and second opposite ends, a threaded bore extending inwardly into said body portion from said first end, a depression extending inwardly into said body portion from said second end, an endless lobed curvilinear surface including a plurality of lobes located outwardly of said axis of rotation and defining the periphery of said depression, and a taper on said endless lobed curvilinear surface extending from said second end inwardly toward said axis of rotation; a stud having an outer threaded surface in mating engagement with said threaded bore, an end portion on said stud located within said depression, and an annular space between said end portion of said stud and said endless lobed curvilinear surface with said annular space including narrower portions proximate portions of said lobed curvilinear surface where said lobes are located.

The various aspects of the present invention will be more fully understood when the following portions of the specification are read in conjunction with the accompanying drawings wherein:

BRIEF DESCRIPTION OF THE DRAWINGS

FIG. 1 is side elevational view of an automotive wheel having the improved locknut of the present invention securing the rim to a stud of the axle;

FIG. 2 is an enlarged fragmentary cross sectional view taken substantially taken subtantially along line 2—2 of FIG. 1 and showing the locknut mounted on the stud;

FIG. 3 is a side elevational view of a protective cap which fits on the locknut of FIG. 2;

FIG. 4 is an end elevational view of the protective cap taken substantially in the direction of arrows 4—4 of FIG. 3;

FIG. 5 is an enlarged cross sectional view of the locknut of FIGS. 1 and 2 taken substantially along line 5—5 of FIG. 6;

FIG. 6 is an end elevational view of the locknut taken substantially in the direction of arrows 6—6 of FIG. 5;

FIG. 7 is an enlarged fragmentary cross sectional view similar to FIG. 2;

FIG. 8 is a cross sectional view taken substantially along line 8—8 of FIG. 9 and showing the construction of the key for turning the locknut;

FIG. 9 is an end elevational view taken substantially in the direction of arrows 9—9 of FIG. 8 and showing the end of the key which mates with the locknut;

FIG. 10 is an end elevational view of the key taken substantially in the direction of arrows 10—10 of FIG. 8 and showing the wrench-receiving end of the key;

FIG. 11 is a fragmentary cross sectional view which is essentially a combination of FIGS. 7 and 8 and which shows the first stage of mounting the key on the locknut;

FIG. 12 is a fragmentary cross sectional view similar to FIG. 11 which shows the second stage of mounting a key on the locknut;

FIG. 13 is a fragmentary cross sectional view similar to FIGS. 11 and 12 which shows the third and final stage of mounting the key on the locknut;

FIG. 14 is a cross sectional view similar to FIG. 5 showing another embodiment of the locknut;

FIG. 15 is a fragmentary cross sectional view similar to FIG. 13 and showing the key secured in completely mounted position on the locknut of FIG. 14;

FIG. 16 is a cross sectional view taken substantially along line 16—16 of FIG. 17 and showing a still further embodiment of the locknut having a rotatable protective shroud which shields the external threads on the locknut;

FIG. 17 is a cross sectional view taken substantially along line 17—17 of FIG. 16 and showing the connection between the rotational shroud and the body of the locknut;

FIG. 18 is a fragmentary cross sectional view similar to FIG. 13 and showing the key mounted in fully seated position on the locknut;

FIG. 19 is an end elevational view of a locknut of the type shown in FIGS., 16-18 but having a curvilinear groove in its face rather than a depression with a tapered peripheral surface such as shown in FIGS. 16-18; and FIG. 20 is an end elevational view of an alternate embodiment similar to FIGS. 14 and 15 but having a curvilinear groove in its face rather than a depression with a tapered peripheral surface.

DESCRIPTION OF THE PREFERRED EMBODIMENTS

The improved locknut 10 of the present invention includes a body portion 11 having an outer surface 12, an end 13, and an end 14. A frustoconical end portion 14' bears against frustoconical depression 15 of vehicle rim 16 after locknut 10 is threadably mounted by means of internally threaded portion 17 onto stud 19 which extends outwardly from vehicle axle 20. Internal threads 17 extend inwardly into body portion 11 from end 13. Extending inwardly into body portion 11 from end 14 is an inwardly tapered curvilinear one-sided lobed peripheral surface 23 which terminates at shoulder 24. Peripheral surface 23 includes a plurality of lobes 25, 26, 27, 29 and 30. The surface 23 may be about 0.10 inches deep and have a taper of between about 5° and 20° to the longitudinal axis of the locknut.

As is well understood in the art, vehicle rim 16 is secured to the axle 20 by means of a plurality of conventional nuts 21. Locknut 10 is secured to stud 19 to prevent unauthorized removal of vehicle rim 16 because locknut 10 can be removed only by the use of a special key 22. In its installed position there is an annular space 23' (FIG. 7) between the outer surface of stud 19 and the inwardly tapered curvilinear lobed peripheral surface 23.

In order to tighten locknut 10 more than finger tight, or to loosen locknut 10 from its fully tightened condition on stud 19, special key 22 must be used which has a tapered end portion 31 for complementary mating engagement with endless curvilinear inwardly tapered peripheral surface 23 which forms the periphery of depression 56 so that tapered end portion 31 can effect mating engagement with the lobes 25, 26, 27, 29 and 30. However, unless the tapered end portion 31 of key 22 is forcedly retained in peripheral surface 23, as an attempt is made to turn the key portion 32, it will cam out of engagement with tapered surface 23 and move in the direction of arrow 34.

In order to retain tapered end portion 31 in engagement with tapered curvilinear surface 23, a sleeve 35 is mounted for rectilinear sliding movement on the outer cylindrical surface 36 of key portion 32. The limit of axial movement of sleeve 35 to the right in FIG. 8 is determined by engagement between annular shoulder 39 of key portion 32 and end 40 of annular sleeve 35. The limit of axial movement of sleeve 35 to the left in FIG. 11 is determined when there is an abutting relationship between annular shoulder 44 of sleeve 35 and surface 41 of spring clip 42 which is mounted in groove 43 of key portion 32.

In order to secure key 22 to nut 10, the following steps are performed, as depicted in FIGS. 11-13. First, the end portion 45 of internal thread 46 on the inside of sleeve 35 is engaged with the end portion 47 of external thread 49, which is of a length of between about two and three turns, of nut 10 until the end 50 of key portion 32 abuts the end 14 of locknut body portion 11. At this time annular shoulder 44 of sleeve 35 will abut side 41 of spring clip 42 (FIG. 11), and the longitudinal axis of key portion 32 will be aligned with the longitudinal axis of locknut 10. Thereafter, key portion 32 is rotated about its longitudinal axis until such time as its annular tapered end portion 31 moves axially into annular space 23' between the outside surface of stud 19 and internal surface 23 and into engagement with tapered curvilinear peripheral surface 23 (FIG. 12). Thereafter, the knurled outer portion 48 of sleeve 35 is grasped and sleeve 35 is rotated so that internal thread 46 is threaded onto locknut thread 49 until such time as annular sleeve shoulder 44 engages side 41 of the spring clip 42. This engagement will cause the tapered end portion 31 of key portion 32 to be firmly seated within curvilinear surface 23 (FIG. 13). Thereafter, a wrench may be applied to hexagonal head 51 at the outer end of key portion 32. It is to be noted that there is a space 52 (FIG. 13) between surface 55 of key portion 32 and the face 14 of locknut 10, thereby insuring that tapered end portion 31 of the key is always fully seated on curvilinear surface 23. It is also to be noted that there is a space 54 between the end 50 of key portion 32 and surface 24 of the locknut, when tapered end portion 31 is fully seated. The existence of spaces 52 and 54 thus insures perfect complementary mating engagement between tapered end portion 31 and internal curvilinear inwardly tapered surface 23. The foregoing procedure of mounting key 22 onto locknut 10 is performed both when the locknut 10 is to be tightened or loosened by means of a wrench applied to hexagonal head 51.

In use, locknut 10 is concealed by a plastic cap 65 having internal threads 66 which are mounted on thread 49 of the locknut. The outer end 67 of the plastic cap is in the shape of a hexagonal nut to match the other nuts 21 which secure the rim to the axle.

The locknut 10, as stated above, is for theft prevention of items such as vehicle rims 16 and other devices with which it is used because, as noted above, a special key must be used to loosen the locknut. If an attempt is made to wedge a foreign object into the depression 56, the foreign object will cam out of depression 56 in the direction of arrow 34 (FIG. 8) when it is turned. This camming action results from the taper of surface 23. Furthermore, with the locknut 10 properly installed and torqued to specifications, as shown in FIG. 7, the end of stud 19 will extend beyond the end 14 of the locknut, severely limiting the access to depression 56 (FIG. 5) of locknut 10. In other words, when locknut 10 is installed as shown in FIG. 7, there is an annular space 23' between the surface 23 of depression 56 and the outside surface of stud 19. In this annular space 23' the distances between stud 19 and lobes 25, 26, 27, 29 and 30 are relatively small. As shown in FIG. 9, the body portion 32 of key 22 has a bore 57 therein which receives the end of stud 19. Therefore, the tapered end portion 31, which is annular, is relatively thin in certain portions thereof, as indicated by the representative sets of arrows 59 shown on portions of FIG. 9 so that it can fit into the relatively small spaces between stud 19 and the lobes 25, 26, 27, 29 and 30. It will be appreciated that only two sets of arrows have been shown for the sake of illustration in the interest of clarity, but there are many additional areas which are thin. Thus, if a makeshift key, with makeshift lobes 60, 61, 62, 63 and 64 and valleys (not numbered) therebetween, should be fabricated from steel alloys commonly available and should be used in conjunction with a sleeve, such as 35 (FIG. 8), so as to forcibly retain said makeshift key in position with depression 56 (FIG. 5), any attempt to loosen and remove a fully tightened locknut will cause the makeshift lobes to buckle and fail from lack of material strength along with the lack of the mandatory uniform contact with the recessed lobes 25, 26, 27, 29 and 30 (FIG. 6) of tapered surface 23 of locknut 10.

In FIGS. 14 and 15 a modified embodiment of the present invention is disclosed. The locknut 70 includes a body 71 having an end 72 and an end 73 and an axis of rotation. A thread 74 extends inwardly from end 73 onto the body portion. A frustonconical surface 75 has a small end at locknut end 72 and terminates at a large end 76. The junction between thread 74 and frustoconical portion 77 is at annular shoulder 79. Thread 74 is of relatively short axial length, preferably about one and one-half turns. Therefore, if it projects outwardly from a recess such as 80 of vehicle rim 81, there will be an insufficient axial length of thread 74 which can be gripped by a wrench to turn locknut 70.

Locknut 70 includes a depression 82 having an internally inwardly tapered peripheral curvilinear surface 83 of the exact type 23 described above relative to FIGS. 1-13. Therefore, additional description is not deemed necessary. An internal frustoconical bore 84 leads into peripheral surface 83. A key, such as 22, as described in detail above, is utilized to turn locknut 70. This style of construction of the locknut of FIGS. 14 and 15 is especially advantageous when employed in instances where the wheel rim has a depression which effectively shrouds the end portion 76 of frustoconical portion 77, thereby eliminating the possibility of removal by a wrench.

Another embodiment of the present invention is disclosed in FIGS. 16-18. Locknut 90 includes a body portion 91 having an end 92 from which an internally threaded bore 93 extends into the body portion. The body portion also has an end 94, and a depression 95 extends inwardly into the body portion therefrom. A tapered curvilinear inwardly extending periphery 96 surrounds depression 95. A thread 97 extends onto body portion 91 from end 94. The periphery 96 may be identical in all respects to the internal periphery 23 described above relative to FIGS. 1-13, and therefore a detailed further description is not deemed necessary.

Locknut 90 differs from locknut 10 in that it has an elongated central cylindrical outer surface 99 having an annular groove 100 therein. A sleeve 101 has an internal cylindrical surface 102 which is rotatably mounted on surface 99. An annular groove 103 is located in surface 102. A resilient metal snap ring 104 is located within grooves 100 and 103 to retain sleeve 101 against axial movement. Sleeve 101 includes an annular shroud portion 105 which is located radially outwardly of thread 97, so that an annular space 106 is located therebetween. Therefore, shroud portion 105 prevents the mounting of a wrench on thread 97 to thereby prevent turning of locknut body portion 91. If a wrench should be applied to the external cylindrical surface 107 of the shroud, the sleeve 101 will turn freely without in any way imparting any torque to body portion 91. The shroud 105 is sufficiently thick and fabricated of sufficiently strong treated steel so that it cannot be broken to provide wrench-gripping access to thread 97. Furthermore, the fit between the outer frustoconical surface 109 of sleeve 101 and the internal surface portion 110 of rim 111 is such that in the event an attempt is made to move sleeve 101 axially into rim depression 112 in the direction of arrow 113, this will be prevented by abutting surface 110 within rim 111, which can be located as little as 1/64 of an inch from the outer surface 109. Thus, shroud 105 cannot be moved an appreciable amount from its mounted position on body portion 91. Sleeve 101 is fabricated of hardened and tempered steel so as to maximize the tensile, yield and impact strength thereof. As can be seen from FIGS. 16–18, the frustoconical surface 98 of body portion 91 and the frustonical surface 109 of sleeve 101 are of the same slope so as to give a uniform outer configuration to locknut 90.

A key 22, as described in detail above in FIGS. 8–13, is used to tighten and loosen locknut 90. Key 22 operates in the exact manner as described above relative to FIGS. 11–13, and therefore an additional description is not deemed necessary. The numerals associated with key 22 in FIG. 18 and which are identical to those of FIGS. 8–13 denote like elements of structure.

Whenever key 22 is not mounted on locknut 90, a plastic cap 65 (FIGS. 3 and 4) is threaded onto thread 97 for two reasons. The first, as explained above, is for concealing the locknut and causing it to resemble the conventional nut 21, as well as providing a dust cover. The second reason is so that the end 68 of cap 65 will abut internal annular shoulder 108 of sleeve 101 to stabilize it against rotation.

In FIGS. 19 and 20 alternate embodiments 70' and 90' of the locknuts of FIGS. 14 and 16, respectively, are shown. The only differences are the curvilinear grooves 115 and 116 of the type shown in U.S. Pat. No. 3,241,498 in the end faces of these nuts, rather than the inwardly tapered peripheral surfaces 83 and 95, respectively.

While preferred embodiments of the present invention have been disclosed, it will be appreciated that it is not limited thereto but may be otherwise embodied within the scope of the following claims.

What is claimed is:

1. A locknut comprising a body portion having an outer surface and an axis of rotation and first and second opposite ends, a threaded bore extending inwardly into said body portion from said first end, a depression extending inwardly into said body portion from said second end, and endless lobed curvilinear surface located outwardly of said axis of rotation and defining the periphery of said depression, a thread on said outer surface extending inwardly from said second end toward said first end, said outer surface including an elongated cylindrical outer surface portion between said thread and said first end, a sleeve rotatably mounted on said elongated cylindrical outer surface, and an annular shroud portion on said sleeve located radially outwardly of said thread in spaced relation thereto, said outer surface including a frustoconical surface having its smaller end at said first end, and said sleeve including a second frustoconical outer surface which is in alignment with said frustoconical surface.

2. A locknut comprising a body portion having an outer surface and an axis of rotation and first and second opposite ends, a threaded bore extending inwardly into said body portion from said first end, a depression extending inwardly into said body portion from said second end, and endless lobed curvilinear surface located outwardly of said axis of rotation and defining the periphery of said depression, curvilinear surface extending from said second end inwardly a thread on said outer surface extending inwardly from said second end toward said first end, said outer surface including an elongated cylindrical outer surface portion between said thread and said first end, a sleeve rotatably mounted on said elongated cylindrical outer surface, and an annular shroud portion on said sleeve located radially outwardly of said thread in spaced relation thereto, a protective cap having a tapped portion for mounting on said thread, an internal shoulder on said sleeve, and an end on said protective cap for bearing on said internal shoulder to thereby lock said sleeve against rotational movement on said outer surface.

3. A locknut as set forth in claim 1 including a taper on said endless lobed curvilinear surface extending from said second end inwardly toward said axis of rotation.

4. A locknut as set forth in claim 2 including a taper on said endless lobed curvilinear surface extending from said second end inwardly toward said axis of rotation.

* * * * *

UNITED STATES PATENT AND TRADEMARK OFFICE
CERTIFICATE OF CORRECTION

PATENT NO.   : 4,618,299
DATED        : October 21, 1986
INVENTOR(S)  : Gary R. Bainbridge et al It is certified that error appears in the above-identified patent and that said Letters Patent are hereby corrected as shown below:

Column 8, lines 25 and 26 (claim 2), delete "curvilinear surface extending from said second end inwardly".

Signed and Sealed this

Twenty-seventh Day of January, 1987

Attest:

DONALD J. QUIGG

Attesting Officer

Commissioner of Patents and Trademarks